C. T. FRANTZ.
TYPE WRITING MACHINE.
APPLICATION FILED AUG. 2, 1917.
Reissued Dec. 11, 1917.
14,407.
3 SHEETS—SHEET 1.
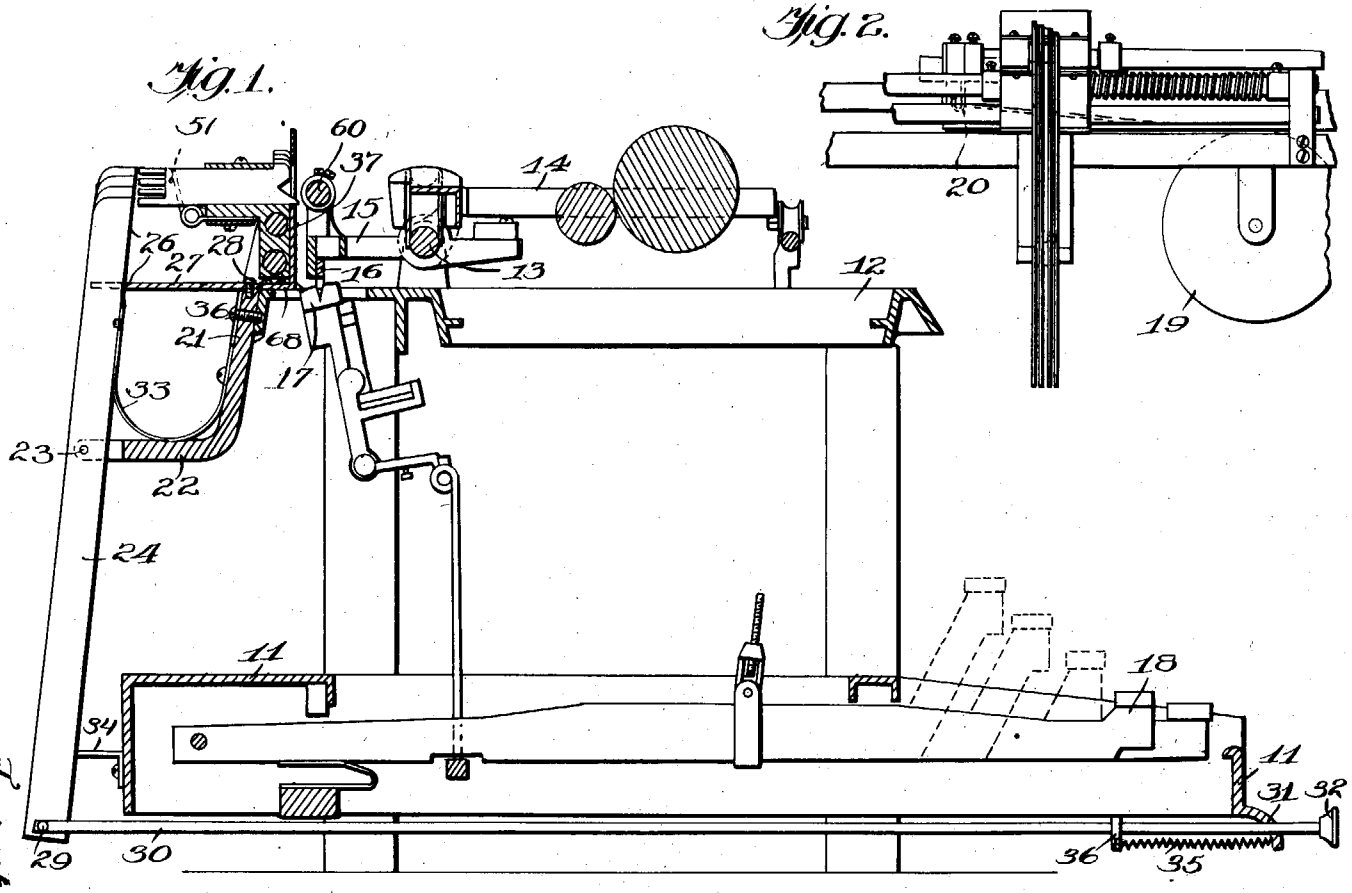
Inventor,
Charles T. Frantz.
By. Jno Jennie
Attorney.

C. T. FRANTZ.
TYPE WRITING MACHINE.
APPLICATION FILED AUG. 2, 1917.
Reissued Dec. 11, 1917.
14,407.
3 SHEETS—SHEET 2.
Fig. 3.
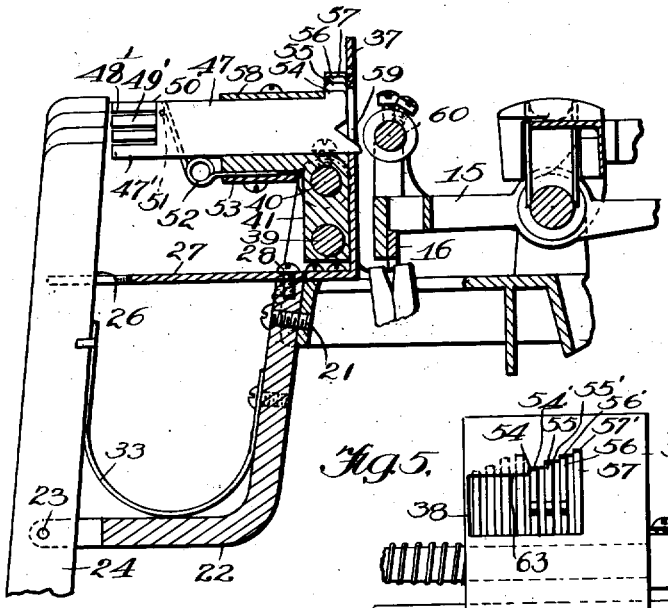
Fig. 5.
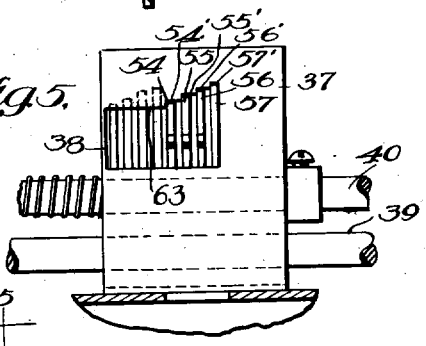
Fig. 9.
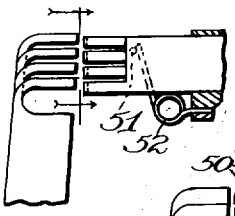
Fig. 4.
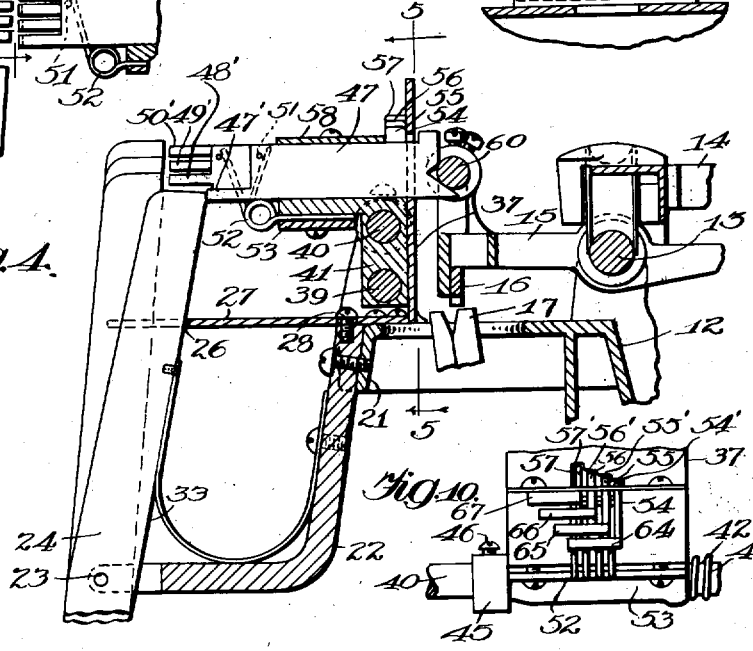
Fig. 10.
Inventor:
Charles T. Frantz
By Jas. Imrie Attorney.

C. T. FRANTZ.

TYPE WRITING MACHINE.

APPLICATION FILED AUG. 2, 1917.

Reissued Dec. 11, 1917.

14,407.

3 SHEETS—SHEET 3.

Inventor
Charles T. Frantz.

By. Jno. Imrie
Attorney

UNITED STATES PATENT OFFICE.

CHARLES T. FRANTZ, OF CHICAGO, ILLINOIS, ASSIGNOR TO FRED P. GORIN, OF CHICAGO, ILLINOIS.

TYPE-WRITING MACHINE.

14,407. Specification of Reissued Letters Patent. Reissued Dec. 11, 1917.

Original No. 1,118,338, dated November 24, 1914, Serial No. 462,193, filed November 12, 1908. Application for reissue filed August 2, 1917. Serial No. 184,171.

*To all whom it may concern:*

Be it known that I, CHARLES T. FRANTZ, a citizen of the United States, residing at Chicago, in the county of Cook and State of Illinois, have invented certain new and useful Improvements in Type-Writing Machines, of which the following is a full, clear, and exact specification.

My invention relates particularly to a tabulating attachment for typewriting machines, and one of its objects is the provision of simple and efficient mechanism of this character whereby the carriage may be released from its feeding mechanism, gradually stopped at the end of its run and arrested in its return movement at a predetermined point.

A further object of the invention is the provision of a locking out device in combination with a buffer which will effect a gradual stopping of the carriage at the end of its run and permit the re-connection of the same with the feeding mechanism after the carriage has returned to a predetermined position.

Another object of the invention is the provision of a tabulating attachment for typewriting machines comprising a resilient buffer for relieving the impact of the carriage and mounted to act in opposition to the motor spring of the typewriting machine and comprising also a locking out device for maintaining connection between the buffer device and the carriage until the latter is returned by said buffer device against the action of the motor spring to a predetermined position.

Other objects of the invention will appear hereinafter, the novel combination of elements being set forth in the appended claims.

In the accompanying drawings,

Figure 1 represents a transverse sectional elevation of an ordinary typewriter with my invention applied thereto.

Fig. 2 is a fragmentary rear view of Fig. 1, showing the usual main motor spring of the typewriter.

Fig. 3 is an enlarged sectional elevation of a portion of Fig. 1.

Fig. 4 is a similar view but showing the carriage disconnected from the spacing dogs.

Fig. 5 is a fragmentary sectional view taken on the line 5—5, of Fig. 4, looking in the direction of the arrows.

Figs. 9 and 10 are views of a modification.

Similar parts are designated by like reference characters throughout the various views.

Figure 6:
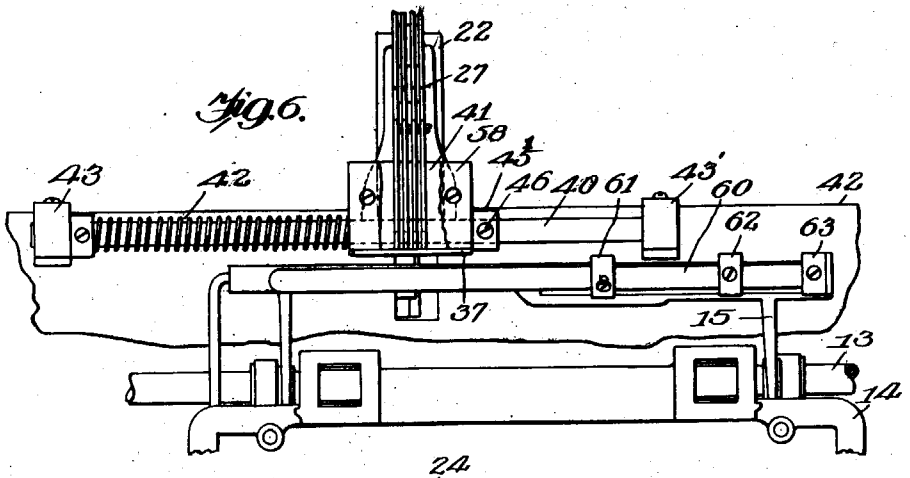
Fig. 6 is a fragmentary plan view showing the buffer spring and locking out mechanism in the position assumed while the typewriter is being used for writing continuously.

Referring to the drawings, 11 designates the base of the typewriting machine, 12 the table of the supporting frame, 13 the back bar of the carriage 14, to which the latter is pivoted and along which it slides in the usual way. Pivoted to the back bar 13 independently of the carriage but connected to move therewith is a frame 15 which carries the escapement rack 16. Coöperating with this rack are spacing dogs 17 which are connected to spacing keys 18. Under the action of the main spring 19, which is connected in any desired manner at 20 to the carriage 14, the latter is fed step by step under the control of the spacing mechanism. These parts are constructed and operated in a manner well understood in the art to control the movement of the carriage while operating the typewriter keys in the ordinary way.

I will now describe the selective stop mechanism for use in tabulating or writing in columns. To the back of the table 12 at 21 is rigidly connected an angular bracket 22, to the outer end of which are pivoted at 23 the motion-transmitting levers 24, four of which are in this instance shown, although the number may be varied as desired. That is to say, one of such levers may be used alone, or two or more of them may be used, depending upon the operation desired. These levers are suitably spaced apart by means of washers 25 and the upper portions of such levers are guided in slots 26 in the outer end of the plate 27 which is rigidly attached to the upper end of the angular bracket 22, to occupy a substantially horizontal position. To the lower end of each of the levers 24 is pivoted at 29 a push rod 30 which extends along under the machine through the guide openings 31 to the front of the machine and to the outer end of the rods are connected the keys 32.

A U-shaped spring 33 connected to the bracket 22 bears on the levers 24 and urges them against the fixed stop 34. This spring may be made sufficiently strong to alone perform this function, but if desired, the springs 35 may be added, one end of each being attached to the base 11 and the other ends being connected to the push rods 30 at 36. If desired, the spring 33 may be omitted and the springs 35 used alone.

Fixed to the rear of the table 12 at 68, is an angular plate 37, which is provided with an opening 38 of special contour, as indicated in Fig. 5, to accomplish one of the objects of the invention. This plate is an important feature of my invention, as it effects the stopping of the carriage at exactly the point predetermined. It should be noted that this plate is rigidly fixed to the frame of the typewriting machine, as are also the horizontal guide plate 27 and the supporting bracket 22, and therefore these parts never move while the plate 37 is acting as the locking out plate.

Figure 7:
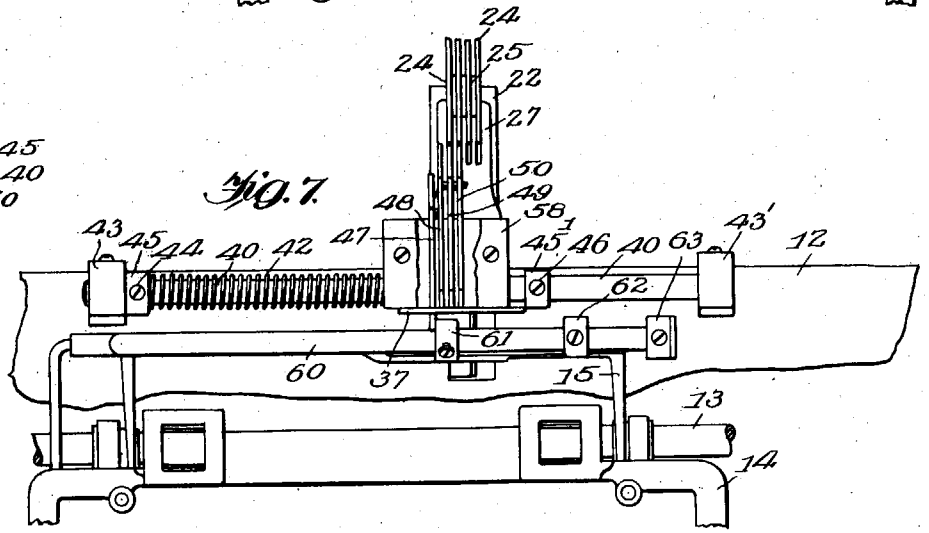
Fig. 7 is a similar view showing the position of parts after a tabulator key has been actuated and the buffer spring is in the act of relieving the impact of the carriage.
Figure 8:
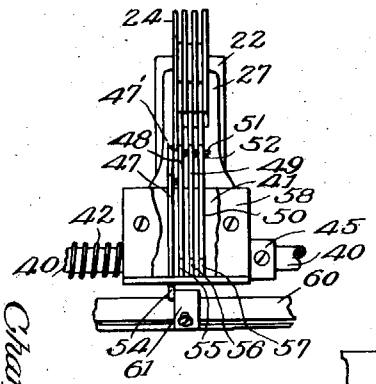
Fig. 8 is also a similar view showing the position of parts just after the latter have returned to approximately the point where the carriage is to be stopped.

Back of the plate 37 are two longitudinal rods 39 and 40, the ends of which are fixed to the supporting standards 43, 43′, which in turn are rigidly attached to the rear of the table 12 of the typewriter frame, as indicated in Figs. 6 and 7. These rods extend parallel to the escapement rack bar 16 and the back pivot bar 13 of the machine, and are for the purpose of guiding and supporting the buffer block 41. The upper rod 40 also carries the buffer spring 42 between one end of the buffer block 41 and the slidable ring 45, the latter being used in connection with a set-screw 44 to adjust the tension of the buffer spring 42. It is evident that the buffer spring 42 tends to move the buffer block to the right, as viewed in Fig. 6, but the extent of this movement is limited by the stopping ring 45′ which may be held in adjusted position by the set-screw 46. As will be explained hereinafter the buffer block must occupy a certain definite position with respect to the locking out plate 37 and such position is secured by varying the position of the limit stop 45′.

As indicated in Fig. 2 the action of the buffer spring is opposed to that of the motor spring 19 of the typewriter and its tension is adjusted to be sufficiently greater than that of the motor spring to return the carriage to its proper position after the buffer block is struck. The tension of the main spring is also adjustable in the well known manner.

In the upper portion of the buffer block 41 are four vertical slots which may be cut into the material of the block. These slots extend from the front to the rear and are adapted to receive the flat plates or plungers 47, 48, 49, and 50 which perform several functions. Each of these plungers is mounted to slide in its respective slot independently of the others and each is provided with a short laterally extending pin 51. Against each of these pins bears the upper-end of a spring 52, there being one spring for each sliding plate or plunger. The lower ends of these springs are fastened to the under side of an extension of the block 41 by means of the plate 53. The springs tend to move the sliding plates to the rear but such movement is limited by the locking lugs 54, 55, 56, and 57, striking against the top plate 58 which is fastened to the buffer block after the plungers have been inserted in their respective slots. The initial positions or inoperative positions of these plungers is such that the locking lugs referred to are entirely back of the plate 37, so that upon lateral movement of said plungers with the buffer block, the plate 37 will not interfere. As shown, these locking lugs are of different heights and are initially directly behind the opening 38 in the locking plate 37 so as to be opposite the respective steps 54′, 55′, 56′, and 57′. Therefore when the parts occupy the positions indicated in Fig. 5 any one of the plungers may be thrust forward through the opening in the locking plate.

The front ends of the plungers in the buffer block are each provided with inclined surfaces or cams 59 for engaging and lifting the longitudinal bar or rod 60, which is connected to the escapement rack frame 15 and carries stops or striking members 61, 62, and 63 movable along the rod 60 and capable of being fastened in adjusted position by means of set-screws, as indicated. These striking members are intended to be set at points corresponding to the predetermined positions where the carriage is to stop in the operation of tabulation. It should be noted that there may be a plurality of such striking members so that the carriage may be stopped at a corresponding number of places where, for instance, several columns of figures are to be tabulated on a single page. If desired, the tabulator bar 60 may be notched laterally to receive U-shaped stops or striking members, as is well understood by those skilled in the art.

When one of the plungers is operated and a cam 59 engages the rod 60 to lift the frame 15 together with the rack bars 16, the latter is disconnected from the escapement pawls 17, whereupon the main spring 19 (Fig. 2)

will advance the carriage 14 freely to the left, as viewed in Fig. 6, until one of the stops, as that designated 61, impinges against the outer end of the plunger and through the same transmits motion to the buffer block against the action of the buffer spring 42. When this happens the rear shoulder of the locking lug 54 moves in front of that portion 63 of the metal plate 37 just to the left of the steps, thereby forming safety mechanism for locking the carriage out of the control of its escapement. In Fig. 5 the dash-lines indicate the positions of the plungers just after the plunger 47 has been struck, the locking lug 54 being in front of the locking portion 63 of the plate 37 so that the plunger 47 cannot be returned to initial position until the buffer spring forces the buffer block to the position where the escapement rack may be permitted to fall to stop the carriage at the desired point. It will therefore be seen that the stopping mechanism is maintained in connection with the carriage until the buffer spring returns the carriage to the predetermined point where it is to stop or come to rest in readiness for the operation of the typewriting keys to effect writing in columns in a minimum space of time. When the locking lug 54 assumes the position indicated by the dash-lines in Fig. 5, the other locking lugs are behind the locking plate as indicated by the dotted lines.

It should be particularly noted that the only addition to the parts which move the platen of the typewriter is the rod 60, which carries the striking members, the buffer block and the buffer spring, together with the stopping plungers and locking plate being connected directly to the frame of the machine. The added momentum of the carriage due to the tabulator attachment is therefore reduced to a minimum. Although the tabulator is herein shown connected to a typewriting machine of the Remington type, it should be understood that it may be applied to other kinds of typewriters, the Remington type being herein shown merely by way of illustration of the invention.

The operation of the tabulator may be explained as follows: During the ordinary operation of the typewriter, the keys 18 are struck and the type bars operated in the usual way to effect the advance of the carriage step by step by the main spring 19 and the escapement mechanism. When tabulations are to be made accurately and in a minimum space of time, the various parts are properly adjusted and one of the auxiliary keys 32 then actuated. In the construction illustrated four such keys are intended to be used but it should be understood that only one such auxiliary key would be used where only one stopping plunger is employed. I have shown a series of four of such plungers and therefore there should be four keys, one corresponding to each plunger. Furthermore, if two or more plungers are used they should be spaced apart such a distance that the lateral face of one plunger is a letter space distant from the corresponding lateral face of the next succeeding plunger.

If the left hand auxiliary key is operated the plunger 47 will be thrust forward to cause the cam face 59 to lift the rod 60 and thus disconnect the feeding mechanism from the carriage, whereupon the latter will jump from wherever it happens to be to the place where the carriage is to ultimately stop and at this point the striking member 61 will engage the outer end of the plunger 47 and through the buffer block compress the spring 42. This will cause the carriage to come to a stop gradually but the spring 42 being stronger than the motor spring of the typewriter, a re-bound will take place, but during this re-bound the locking lug 54 coöperating with the locking plate 37 prevents the return of the plunger 47 and therefore the connection between the latter and the carriage is maintained until the carriage returns to the position where it is to be stopped or the operative connection of the feeding mechanism is to be reëstablished just as soon as the locking dog 54 returns to the step 54′, the spring 52 will automatically return the plunger provided the tabulating key has been released. This will cause the bar 60 to be released and the rack bar 16 to fall. It will be noticed that the main spring acts in opposition to the buffer spring and therefore absorbs the recoil of the buffer spring. This recoil may not be entirely absorbed in every instance, it being sufficient to absorb it to such an extent that after the plunger is disengaged from the striking member on the rod 60, the movement of the carriage will not be continued as much as a letter space.

I will now explain the various adjustments which should be made to secure this operation. If it be desired to write a column of figures, the carriage is first set at the desired point, where the first numeral is to be written and while held in such position the stop 61 is adjusted so as to just contact the plunger 50 when thrust forward through the opening in the plate 37. As already explained, the right hand face of the plunger 47, for instance, is letter space distant from the right hand face of the plunger 48 and so on, so that when the carriage is moved one step farther along such stop 48 will just contact with the left hand face of the striking member 61 when the plunger 48 is thrust forward. The same is true with respect to the plungers 49 and 50 or any additional number that may be used. As arranged the apparatus is convenient for tabulating columns of figures of hundreds, tens, units, and decimal points, so that when the right hand key 32 is actuated, the carriage will jump to the hundreds place and three figures, a decimal point, and two more figures may be written. By pushing the next key to the left, the carriage will stop at the tens place; by operating the third key from the right the carriage may be stopped at the units place; and by operating the extreme left hand key the carriage will stop in the position corresponding to the decimal points. After one set of figures in one column are written, one or more sets of figures may be written for succeeding columns on the same page in the same line. For instance, after operating one of the tabulating keys and writing the figures for the corresponding column, one of such keys may be operated again to secure a further jumping of the carriage so that another striking member, as that designated 62 on the rod 60, will impinge against a plunger of the stopping mechanism to effect a stopping of the carriage at the desired point for the figures in the next column. The striking member 62 is adjusted in the same manner as that designated 61. And if the third column is to be written the striking member 63 is to be adjusted in the same manner. If the bar 60 is notched laterally as hereinbefore referred to, such notches are so arranged that each will be a letter space distant from the next succeeding one and in such event the U-shaped striking members may be located at the points corresponding to the point where the carriage is to be stopped.

Preferably the main spring is first adjusted to have the proper tension for operating the carriage step by step with a force to suit the operator. The tension of the buffer spring 42 is then adjusted so as to be only as much stronger than the main spring as is necessary to bring the buffer block, stop plunger and carriage back to the position where the connection between the escapement rack bar and the escapement pawls is to be reëstablished. That is to say, the buffer spring is put under such tension that after gradually stopping the carriage the latter will be returned by it against the action of the main spring and be brought to a stop at or about the time the plunger flies back to initial position and allows the escapement frame to fall. The buffer spring must be sufficiently strong under any circumstances to return the carriage to the position where the locking lug can slip under its step in the locking plate 37. The buffer spring should therefore return the buffer block and carriage to such position that the former will abut against the limit stop 45′ on the rod 40. The tension of the spring 42 may be varied by sliding the ring 45 along the rod 40 and fastening it in the adjusted position by means of the set screw 44, and the position of the abutment 45′ may be varied in a similar manner. It will be evident that if the buffer spring is under too great tension, it will tend to recoil too strongly, so that when the buffer block strikes the stop 45′ and the plunger releases the escapement rack, the carriage will tend to continue to move by momentum and move too far before the rack reëngages the pawls. By proper adjustment of the tension of the motor spring of the typewriter and of the tension of the buffer spring, this continued movement of the carriage may be prevented or reduced to such an extent as not to equal a letter space so that the carriage will be stopped in exactly the position desired.

If the auxiliary key is immediately released after the stopping mechanism begins to operate, the parts will be restored automatically to their initial positions and the carriage automatically stopped at the required point. If, however, the auxiliary key is held in until after the carriage finally comes to rest, the upper end of the lever 24 may offer an obstruction against the complete return of the plunger so that the extension 47′ will come back against the side of the upper end of the lever 24 holding the latter by friction so that the tabulator key will have to be pulled back to initial position. Obviously the spring 33 may be made sufficiently strong to overcome this difficulty, so that even when this occurs the apparatus will operate to stop the carriage at the desired point and all the parts will be restored at the proper time to their initial positions in readiness for the next operation. If it is desired, however, not to have a strong spring 33 or 35 so that the tabulator keys may be operated more easily, the extensions 54, 55, 56, and 57 may be provided with tail pieces 64, 65, 66, and 67, respectively, so that the upper end of the lever 24 will be held continually in connection with the plunger during the operation of the stopping mechanism so that after the plunger returns to initial position the lever 24 is absolutely free to return to its initial position when released. This modification is shown in Figs. 9 and 10. Fig. 9 also indicates that the upper ends of the levers 24 are U-shaped so that the tail pieces referred to will not be moved by the lever other than that with which it is intended to coöperate. It will also be noticed that the extensions 47′, 48′, and 49′ are arranged diagonally and the levers 24 are of different lengths so that after a plunger is thrust forward and is then moved laterally by the impact of the carriage, the upper end of the operated lever 24 will not abut against the next extension 48′, but the latter will simply pass over the same.

Although I have shown the vertical width of the left hand portion of the opening 38 as uniform and a little greater than the vertical width of the plungers of the stopping mechanism and the vertical width of the right hand portion of the opening 38 variable as indicated, I wish it to be understood that I do not desire to be limited to this exact construction, as such opening 38 may be made of various shapes or contour and still fall within the spirit and scope of my invention. So, also, those skilled in the art may make various changes in the details and arrangement of other parts of my invention as defined by the claims and I wish therefore not to be limited to the precise construction herein disclosed.

Having thus fully described my invention, what I claim is:—

1. The combination in a typewriting machine, of a tabulator attachment comprising a resilient buffer to gradually stop and then return the carriage, a locking-out device, and means to prevent restoration of said locking-out device to initial position until the carriage is stopped in a predetermined position.

2. In a typewriting machine, the combition with a movable carriage, of apparatus comprising a cushion for gradually stopping said carriage, means for locking said apparatus in operative position during the return of said carriage, and means to prevent the arresting of the carriage until it stops in a predetermined position.

3. In a typewriting machine, the combination with a movable carriage, of a resilient buffer, mechanism for locking the buffer in operative relation to the carriage until the latter is returned to a predetermined point, and means co-acting with said mechanism to prevent the arresting of the carriage until it stops or nearly so at such predetermined point.

4. In a typewriting machine, the combination with a movable carriage, of step by step spacing mechanism, means for disconnecting said spacing mechanism, apparatus for relieving the impact of the carriage when being stopped at the end of its run, and means for effecting the reëngagement of said spacing mechanism, and the consequent arresting of the carriage when the latter is stopped or nearly so in a predetermined position.

5. In a typewriting machine, the combination with a movable carriage, of mechanism comprising a cushion for gradually stopping said carriage after the letter-feed mechanism is disconnected and the carriage skips in letter-feed direction, and means for locking said stopping mechanism in operative position in relation to the carriage until the latter is returned by the cushion to a predetermined point, the letter feed mechanism being then automatically reconnected and the stopping mechanism restored to initial position.

6. The combination with a typewriter comprising a carriage and feeding mechanism therefor, of a plurality of striking members spaced at predetermined distances and moving with the carriage, an elastic buffer device, a key and connection for effecting the operation of said buffer device to gradually stop the carriage, a locking-out device for maintaining connection between one of the striking members and said buffer device during the return of the latter to initial position, and means preventing the restoration of said locking-out device until the carriage stops, or nearly so, at the position where the carriage is to be held at rest by the feeding mechanism.

7. In a typewriting machine, the combination with a movable carriage, of a striking member movable with the carriage, an elastic stop device adapted to be engaged by said member to stop the carriage gradually, and means for maintaining said stop device in engagement with said striking member until the carriage returns to a predetermined position.

8. In a typewriting machine, the combination with a carriage, of feeding mechanism therefor, a motor for moving said carriage in one direction step by step, tabulator keys and connections for freeing said feeding mechanism and causing said carriage to skip over a plurality of letter spaces, a buffer for gradually stopping said carriage at the end of its run and returning the same to or near a predetermined position where the carriage is to come to rest, and locking-out apparatus to prevent the arresting of the carriage by the restoration of the feeding mechanism to initial position, until the carriage stops or nearly so in such position.

9. In carriage stops for typewriting machines, the combination with elastic stop mechanism, of a striking member co-acting with the stop mechanism after the carriage skips in letter-feed direction, a motor, a key connected to effect the engagement of said member with said stop mechanism, and a device preventing the disengagement thereof until the carriage reaches a predetermined stopping point.

10. In a tabulator attachment for typewriters, the combination with a movable carriage and feeding mechanism therefor, of a striking member movable with said apparatus for simultaneously disconnecting said feeding mechanism and interposing a plunger in the path of movement of said striking member, mechanism for operating upon the engagement of said plunger by said striking member for gradually stopping the carriage, and means coacting with said plunger for preventing its return to initial position until the carriage rebounds to a predetermined stopping point.

11. The combination with a typewriter comprising a movable carriage, a motor spring and step by step spacing mechanism, of buffer mechanism for gradually stopping the carriage and returning the same against the action of said motor spring to a predetermined point, and a locking-out device for maintaining the buffer mechanism in operative position until such point is reached.

12. The combination with a typewriter comprising a movable carriage, a motor spring and step by step spacing mechanism, of buffer mechanism comprising a spring, means for effecting operative connection between the carriage and the buffer mechanism to stop the carriage gradually, the tension of said buffer spring being sufficiently greater than the tension of the motor spring to return the carriage to a predetermined position, and a locking-out device to maintain the connection between the buffer mechanism and the carriage during such return.

13. In a selective stop mechanism for typewriter carriages, the combination with a carriage, a motor spring and spacing mechanism, of a striking member, an elastic buffer device comprising a series of plungers, mechanism for actuating said plungers to interpose the same in the path of movement of said striking member, and a locking-out device for maintaining the connection between a plunger and the striking member until the carriage returns to a predetermined point.

14. The combination with a typewriter comprising a carriage and feeding mechanism therefor, of a plurality of striking members spaced apart predetermined distances and moving with the carriage, an elastic buffer device, a key and connections for effecting the operation of said buffer device to gradually stop the carriage, and a locking-out device for maintaining connection between one of the striking members and said buffer device until the carriage returns to a predetermined position.

15. The combination with a typewriter comprising a carriage and feeding mechanism, of a plurality of adjustable striking members connected to said carriage to move therewith, of a series of plungers, a corresponding series of tabulator keys and connections for moving said plungers into the path of movement of said striking members and disconnecting said feeding mechanism to permit said carriage to move freely until one of said members strikes a plunger, a buffer block and a buffer spring for receiving the impact of said striking member against a plunger, a locking plate, and locking lugs one on each of said plungers to maintain connection between a plunger and a striking member until the carriage returns to a predetermined stopping point.

16. In a tabulator attachment for typewriters, the combination with buffer mechanism comprising a plunger, of a striking member movable with the carriage of the typewriter, means for actuating said plunger to effect the operation of said buffer mechanism to gradually stop the carriage, and a locking-out device comprising a lug extending from said plunger and a plate through an opening in which the plunger is movable.

17. In a tabulator for typewriters, the combination with a buffer spring, of a buffer block, a striking member, a plunger, mechanism for operating said plunger, a locking lug carried by said plunger, and a plate having an opening so shaped as to permit the locking lug to be moved through the same only when in initial position.

18. In a tabulator for typewriters, the combination with buffer mechanism, of means for connecting the buffer mechanism to the carriage of the typewriter when the latter is to be stopped gradually, a locking-out plate, and a locking lug movable through said plate and in front of a portion thereof to prevent the stopping of the carriage during its return movement until it reaches a predetermined point.

19. In a tabulator for typewriters, the combination with buffer mechanism, of a plunger connected thereto, a striking member, a bar or rod carrying said member and movable with the carriage of the typewriter, a cam on said plunger, means for actuating said plunger to interpose the same in the path of movement of said member, and cause said cam to lift said bar to disconnect the feeding mechanism of the typewriter, a locking plate, and a locking lug movable through said plate and in front of a portion thereof to prevent the stopping of the carriage during its return movement until it reaches a predetermined point.

20. In a tabulator for typewriters, the combination with a buffer spring, of a buffer block, a plunger connected to said block, a spring tending to hold said plunger in its initial position, and a stop for limiting the movement of said plunger.

21. In a tabulator for typewriters, the combination with a buffer spring, of a sliding buffer block, a fixed locking plate, a stop plunger, a lug on said plunger and movable through said plate and in front of a portion thereof.

22. In a tabulator for typewriting machines, the combination with the carriage and feeding mechanism therefor, of a disconnecting bar, connected to move with said carriage, striking members carried by said bar, buffer mechanism mounted in stationary position, and means for operating said disconnecting bar and effecting the operation of said buffer mechanism to relieve the impact of the carriage.

23. In a tabulator for typewriters, the combination with a buffer spring, of a buffer block, a plunger mounted in a slot in said buffer block, a locking lug on said plunger, a stop co-acting with said lug to limit the movement of said plunger in one direction, a spring for moving said plunger in such direction, and a locking plate cooperating with the said lug to prevent the return of the plunger to initial position until the buffer block returns to its initial position.

24. In a tabulator for typewriters, the combination with a buffer spring, of a buffer block, a series of plungers carried by said block, locking lugs on each of said plungers and of different sizes, and a locking plate having graduated passageways for the respective locking lugs.

25. In a tabulator for typewriters, the combination with a buffer spring, of a buffer block, a slide bearing for said block, a series of plungers mounted in said block, a corresponding series of locking lugs of different sizes, a fixed locking plate having a stepped opening through which the lugs may be moved only when in initial position, a portion of said plate co-acting with the locking lugs to prevent their return to initial position until the buffer block returns to its initial position, and a limit stop for said buffer block.

26. In a tabulator for typewriters, the combination with a resilient buffer, of a buffer block associated therewith, a plunger connected to said block, and a locking plate coöperating with said plunger.

27. In a tabulator for typewriters, the combination with a resilient buffer, of a plunger, a carrier for said plunger associated with said buffer, and a locking plate coöperating with said plunger.

28. In a tabulator, the combination with a resilient buffer, of a plunger, a carrier for said plunger and associated with said buffer, a locking plate coöperating with said plunger, and means for restoring said plunger to initial position.

29. In a tabulator for typewriters, the combination with a resilient buffer, of a plunger, a carrier for said plunger and associated with said buffer, a locking plate cooperating with said plunger, means for moving said plunger to operative position, and automatic mechanism for restoring said plunger to initial position.

30. In a tabulator for typewriters, the combination with a rod adapted to be secured to the typewriter frame, of a resilient buffer mounted thereon, a buffer block slidable on said rod, a plunger carried by said buffer block, and a locking plate secured to said typewriter frame and provided with an opening and notches coöperating with said plunger.

31. In a tabulator for typewriters, the combination with a support, of a resilient buffer, a plunger, a carrier for said plunger, and a locking plate mounted in fixed position and associated with said plunger to cooperate therewith.

32. In a tabulator for typewriters, the combination with supporting rods, of a resilient buffer mounted thereon, a plunger, a carrier for said plunger associated with said buffer and also mounted on said supporting rods, a fixed locking plate coöperating with said plunger, means for moving said plunger to operative position, and automatic mechanism for restoring said plunger to initial position.

33. In a tabulating attachment for typewriters, the combination with a resilient buffer for the carriage to gradually stop the same in its letter-feed movement, of means for automatically locking out the letter feed mechanism of the typewriter after a predetermined point has been reached by the carriage in skipping in letter feed direction, and means permitting restoration of the letter-feed mechanism when the carriage stops substantially at the point predetermined by the resilient buffer stop.

34. In a tabulating attachment for typewriting machines, the combination with a movable carriage, of stop apparatus, a cushion for relieving the force of the impact of the carriage when the stop apparatus is operated, means for automatically locking out the letter-feed mechanism of the typewriter when a predetermined stopping point is reached and so maintaining the same until the carriage comes to rest at such predetermined point, and means permitting restoration of the letter-feed mechanism when the carriage stops at such predetermined point.

35. In a tabulator attachment for typewriting machines, the combination with means for disconnecting the feed mechanism of a typewriter and permitting the carriage to skip toward a predetermined point, of resilient buffer mechanism for gradually stopping the carriage and returning it to such predetermined point, means for automatically locking-out the letter feed mechanism of the typewriter during the gradual stopping and return of said carriage, and means permitting automatic restoration of the letter feed mechanism at such predetermined point.

36. In a tabulator attachment for typewriting machines, the combination with a movable carriage, of stop apparatus, a cushion for relieving the force of the impact of the carriage when the stop apparatus is operated, means for automatically locking out the letter feed mechanism of the typewriter when a predetermined point is reached by the carriage and so maintaining said letter feed mechanism until the carriage comes substantially to rest at such predetermined point, and means permitting automatic restoration of the letter feed mechanism to hold the carriage at rest at such predetermined point.

37. In a typewriting machine, the combination with resilient buffer apparatus, of plunger stop mechanism, and a locking-out device coöperating with said plunger stop mechanism, said locking device including a stepped element.

38. In a tabulator for typewriting machines, the combination of means for releasing the step by step feed of the typewriter with coöperating stops on the typewriter frame and on the carriage respectively, one of which is adapted to be projected into the path of the other to arrest the carriage, a cushion to relieve the force of the impact of the carriage when said stops collide, and a locking-out device coöperating with said stops, said locking-out device including a stepped element to permit restoration of said step by step feed at a predetermined point.

39. In a typewriting machine, the combination with a movable carriage, a motor spring therefor, of stop mechanism, step by step spacing mechanism, means for disconnecting the step by step spacing mechanism to permit the carriage to skip and engage said stop mechanism, means for cushioning the impact of the carriage against said stop mechanism, the recoil being cushioned by the motor spring, and automatic mechanism for locking-out said step by step spacing mechanism until the carriage comes to rest at the position designated by the stop mechanism.

40. In a typewriting machine, the combination with a movable carriage, of tabulating mechanism, a cushion to relieve the impact of the carriage in letter feed direction against the said tabulating mechanism, and means for automatically locking out the letter feed of the typewriter at the time that the carriage engages the tabulating mechanism and after such time until the tabulating mechanism returns to the position it occupied when the carriage engaged the same, the letter feed being then automatically restored and the carriage stopped at the point predetermined by the tabulator mechanism.

41. In a typewriting machine, the combination with a movable carriage, of tabulating mechanism comprising a plurality of adjustable stops equally spaced apart from each other, a cushion to relieve the impact of the carriage moving in letter feed direction and engaging one of said tabulator stops, means for limiting the rebound of the carriage, means for automatically locking out the letter feed of the typewriter after the impact between the carriage and one of the tabulator stops, and means for automatically restoring the said tabulator stops to initial position to permit reconnecting the letter feed of the typewriter to stop the carriage at the point predetermined by said tabulator stop.

42. In a typewriting machine, the combination with a movable carriage, of motor mechanism and step by step spacing mechanism therefor, a tabulator stop, a tabulating key for releasing the step by step spacing mechanism and permitting the carriage to be moved freely and automatically by said motor mechanism until the said tabulating stop is engaged by said carriage and while said tabulating key remains depressed, a cushion to relieve the impact of the carriage after said tabulating stop is engaged, means for automatically locking out the step by step spacing mechanism of the typewriter after such impact of the carriage, such locking out means operating automatically and independently of the tabulator key after the impact, and means independent of the type keys or the tabulator key to permit automatic restoration of the step by step spacing mechanism when the carriage stops within a letter space from the point where the tabulating stop is engaged by the carriage.

43. In a typewriting machine, the combination with a movable carriage, of tabulating mechanism comprising a plurality of stops, a cushion to relieve the impact of the carriage against one of said stops when the carriage moves freely and automatically in letter feed direction, means for automatically locking-out the letter feed of the typewriter at and after the time that the carriage engages one of said stops and until the carriage returns to the point where it engaged said stop, and means to permit automatic reconnecting of the letter feed of the typewriter only when the carriage has been returned by the cushion to substantially the same position relatively to the typewriter frame as was occupied when the tabulator stop was first engaged by the carriage.

44. In a typewriting machine, the combination with a movable carriage, of tabulating mechanism comprising decimal stops, a cushion to relieve the impact of the carriage against any one of said stops after the carriage skips freely and automatically in letter feed direction and contacts with one of said stops, means for automatically locking out the letter feed of the typewriter after the impact between the carriage and one of said stops, and means to permit automatic restoration of the letter feed of the typewriter when the carriage returns to the point where it engaged one of said stops.

45. In a typewriting machine, the combination with a movable carriage, of tabulating mechanism comprising decimal stops, a cushion to relieve the impact of the carriage against any one of said stops after free and automatic skipping of the carriage in letter feed direction and after engaging one of said stops, means for automatically locking out the tabulating mechanism and holding the letter feed mechanism disconnected from the time the impact takes place until the carriage returns to the point of impact, and means for automatically unlocking the tabulator mechanism and permitting reconnecting of the letter feed mechanism substantially at the point of impact.

46. In a typewriting machine, the combination with a movable carriage, a motor spring therefor, tabulating mechanism comprising a plurality of decimal stops, a cushion to relieve the impact of the carriage against any one of said stops in letter feed direction, the motor spring limiting the rebound of the carriage, means for automatically locking out the letter feed mechanism of the typewriter after the impact and until the carriage returns to the point of impact, and means for automatically releasing the locking-out means and permitting restoration of the letter feed of the typewriter to normal position when the carriage comes to rest within the letter space from the point indicated by the operated stop of the tabulating mechanism.

47. The combination with a typewriting machine, of tabulating mechanism therefor comprising a cushion to relieve the force of the impact of the carriage when the latter is arrested, a locking device which automatically remains in a continuously locked condition during the compression and expansion of said cushion, and means for thereafter automatically unlocking said locking device while the carriage is under the control of the tabulating mechanism.

48. The combination with a typewriting machine, comprising escapement feed mechanism, of tabulating apparatus comprising stops on the typewriter frame and the carriage respectively, which are adapted to cooperate with each other to arrest the carriage, a cushion to relieve the resultant impact of the carriage, and safety mechanism which locks the carriage out of the control of its escapement feed and which remains in such locked condition after the said stops cooperate and until the carriage returns to the position of impact, and means to permit restoration of the control of the carriage automatically at a selected point to the said feed.

49. The combination with a typewriting machine, of tabulating mechanism comprising stops on the typewriter frame and the carriage respectively, which are adapted to coöperate with each other to arrest the carriage, a cushion to relieve the impact of the carriage when said stops engage, and safety mechanism for taking the carriage out of the control of its escapement and locking it in such condition after the carriage has passed the point of impact and until it returns thereto, and means to permit restoration of the control of the carriage to the escapement feed when the carriage momentarily stops at said impact point upon its return thereto.

50. The combination with a typewriting machine comprising a frame, carriage, motor mechanism, an escapement feed apparatus, of a tabulator comprising stops on the typewriter frame and carriage respectively, means for thrusting one of said stops into the path of the other and releasing the escapement feed, a cushion to relieve the impact of the carriage when the motor mechanism moves the carriage and said stops engage, safety mechanism to lock the carriage out of the control of its escapement feed automatically and constantly from the time of the impact of the stops until the carriage is returned by the said cushion to the point which the carriage occupied when it first began to act upon the cushion, and means for automatically unlocking the safety mechanism when the carriage momentarily settles at such point of impact.

51. The combination with a typewriting machine comprising escapement feed and a carriage, of tabulating mechanism comprising stops on the carriage and the typewriter frame respectively, which collide with each other to arrest the carriage when the escapement feed is released, a cushion to relieve the impact of the carriage when the stops collide, safety mechanism for locking the carriage out of the control of its escapement feed from the time of the collision of said stops and while the carriage is moving forward and returning until the carriage rests momentarily in a predetermined position, and means for automatically unlocking the safety mechanism and permitting restoration of the escapement feed to stop the carriage at such predetermined position.

52. The combination with a typewriting machine comprising a frame, a carriage and escapement feed, of a tabulating mechanism comprising stops on the typewriter frame and carriage respectively, means for releasing the escapement feed and causing the carriage to skip in letter feed direction until said stops collide, a cushion to relieve the impact of the carriage when the stops collide, a safety mechanism for locking the carriage out of the control of its escapement feed during the compression of said cushion and only until the same has fully expanded to the point of collision of said stops, and means to permit automatic restoration of the escapement feed when the carriage momentarily rests at the point of collision upon its return thereto.

53. The combination with a typewriter and tabulating machine, of a cushion to relieve the impact of the typewriter carriage which follows the operation of the tabulating mechanism, and safety mechanism which locks the tabulating mechanism in its operative position from the time of the impact until the carriage returns to the original point of impact, after which the said safety mechanism automatically unlocks.

54. In a typewriting machine comprising tabulating mechanism, the combination with the carriage, a motor spring therefor, of carriage-arresting means including a cushion on which the carriage acts when it passes a predetermined position in a tabulating operation, said cushion being effective to return the carriage to that position, and means to locate the carriage at the predetermined position after it is repelled by said cushion, the motor spring acting with said means.

55. In a typewriting machine comprising tabulating mechanism, the combination with the carriage, a motor spring therefor, of carriage-arresting means including a cushion on which the carriage acts when it passes a predetermined position in a tabulating operation, said cushion being effective to return the carriage to that position, and means to locate the carriage at the predetermined position after it is repelled by said cushion, this means including a locking plate and a locking lug for locking said arresting means, the motor spring acting with said means.

CHARLES T. FRANTZ.

Witnesses:
E. T. Hanson,
S. Orb.